United States Patent
Sarcone et al.

(10) Patent No.: US 8,661,163 B2
(45) Date of Patent: Feb. 25, 2014

(54) TAG ALLOCATION FOR QUEUED COMMANDS ACROSS MULTIPLE DEVICES

(75) Inventors: Christopher J. Sarcone, San Jose, CA (US); Sergio J. Henriques, Valencia, CA (US)

(73) Assignee: Apple Inc., Cupertino, CA (US)

( * ) Notice: Subject to any disclaimer, the term of this patent is extended or adjusted under 35 U.S.C. 154(b) by 143 days.

(21) Appl. No.: 13/215,079

(22) Filed: Aug. 22, 2011

(65) Prior Publication Data

US 2013/0054840 A1 Feb. 28, 2013

(51) Int. Cl.
*G06F 3/00* (2006.01)

(52) U.S. Cl.
USPC .................................. 710/5; 710/19

(58) Field of Classification Search
USPC ....................................... 710/5, 19
See application file for complete search history.

(56) References Cited

U.S. PATENT DOCUMENTS

| | | | | |
|---|---|---|---|---|
| 5,687,390 A * | 11/1997 | McMillan, Jr. | | 710/5 |
| 6,263,445 B1 * | 7/2001 | Blumenau | | 726/2 |
| 2004/0252716 A1 * | 12/2004 | Nemazie | | 370/447 |
| 2005/0240833 A1 * | 10/2005 | Azevedo et al. | | 714/47 |
| 2006/0041691 A1 * | 2/2006 | Bashford et al. | | 710/8 |
| 2007/0198756 A1 * | 8/2007 | Norgaard | | 710/39 |

* cited by examiner

*Primary Examiner* — Farley Abad
(74) *Attorney, Agent, or Firm* — Womble Carlyle Sandridge & Rice LLP

(57) ABSTRACT

The disclosed embodiments provide a system that facilitates the processing of commands in a set of devices. The system includes a host bus adapter that provides an interface for connecting the set of devices to the host and manages the allocation of a set of tags to one or more of the devices. For each device connected to the host, the system also includes a queue-management apparatus that sends a tag request for the device to the host bus adapter. The queue-management apparatus then receives a subset of the tags for the device from the host bus adapter and uses the set of tags to queue commands from the host to the device and track the status of the queued commands.

22 Claims, 5 Drawing Sheets

TAG ALLOCATION FOR QUEUED COMMANDS ACROSS MULTIPLE DEVICES

BACKGROUND

1. Field

The disclosed embodiments relate to the processing of commands by devices in a computer system. More specifically, the disclosed embodiments relate to techniques for managing the allocation of a set of tags to a set of devices connected to a host, in which the tags are used to queue commands from the host to the devices and track the status of the queued commands.

2. Related Art

A modern computer system typically includes a motherboard containing a processor and memory, along with a set of devices connected to the motherboard through a number of interfaces. For example, a Serial Advanced Technology Attachment (SATA) interface may facilitate data transfer between one or more storage devices (e.g., hard disk drives, optical drives, solid-state drives, hybrid hard drives, etc.) and the motherboard. A SATA host bus adapter may provide the SATA interface, while a SATA port multiplier may allow multiple storage devices to be connected to the motherboard via the host bus adapter.

To improve the efficiency of communication between the motherboard and a device, an interface may enable the queuing of commands from the motherboard to the device. For example, a SATA interface may provide a Native Command Queuing (NCQ) mechanism that allows a processor to issue queued commands to a storage device. The queued commands may then be reordered by the storage device prior to execution to reduce latency (e.g., seek latency, rotational latency, etc.) associated with executing the queued commands.

In addition, the interface may use a set of tags to identify and track the status of queued commands in a device. For example, a SATA host bus adapter may support up to 32 numeric tags for queued commands in a SATA device. A device driver for the SATA device may issue a number of queued commands to the device, with each queued command containing a unique tag value (e.g., from 0 to 31) for the command. The device driver may also set a bit corresponding to the tag value in a 32-bit status register to indicate that the queued command is outstanding. After one or more queued commands have been completed, the device may provide a status return for the completed command(s) by clearing the bits corresponding to the tag value(s) of the completed command(s) in the status register.

However, queued commands may be difficult to identify and/or track if multiple devices are connected to the same interface. For example, each storage device connected to a SATA interface may support 32 tags for queued commands on the storage device, while a SATA host bus adapter may support 32 tags for all queued commands issued on the SATA interface. As a result, accurate identification of queued commands may be precluded if the same tag values are used to identify queued commands by multiple storage devices connected to the SATA interface (e.g., via a port multiplier).

Hence, what is needed is a mechanism for facilitating the identification and tracking of queued commands across multiple devices connected to an interface.

SUMMARY

The disclosed embodiments provide a system that facilitates the processing of commands in a set of devices. The system includes a host bus adapter that provides an interface for connecting the set of devices to the host and manages the allocation of a set of tags to one or more of the devices. For each device connected to the host, the system also includes a queue-management apparatus that sends a tag request for the device to the host bus adapter. The queue-management apparatus then receives a subset of the tags for the device from the host bus adapter and uses the set of tags to queue commands from the host to the device and track the status of the queued commands.

In some embodiments, managing the allocation of the set of tags to one or more of the devices involves:

(i) receiving the tag request;
(ii) allocating the subset of the tags to the device based on an activity level of the device; and
(iii) responding to the tag request with the subset of the tags.

In some embodiments, managing the allocation of the set of tags to one or more of the devices further involves updating the subset of the tags based on the activity level of the device and activity levels of other devices connected to the host.

In some embodiments, managing the allocation of the set of tags to one or more of the devices involves reserving two tags for each of the devices.

In some embodiments, the interface is a Serial Advanced Technology Attachment (SATA) interface.

In some embodiments, the set of devices includes a storage device.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
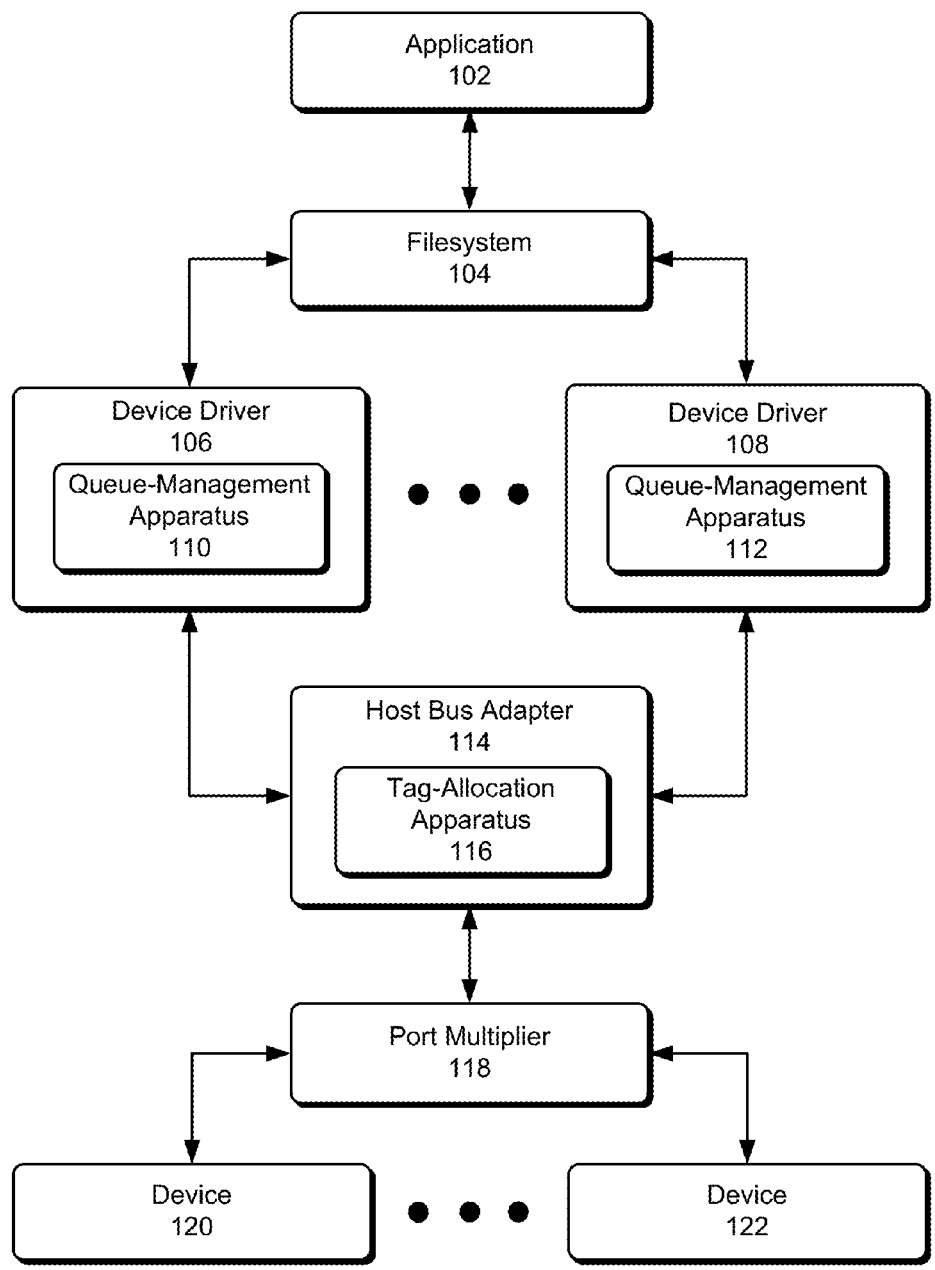
FIG. 1 shows a schematic of a system in accordance with an embodiment.

The disclosed embodiments provide a method and system for facilitating the processing of commands within a computer system. As shown in FIG. 1, the computer system includes a set of devices 120-122 connected to a host in the computer system through a port multiplier 118 and a host bus adapter 114. Host bus adapter 114 may provide an interface through which data is transferred between the host and devices 120-122, and port multiplier 118 may correspond to a unidirectional splitting device that allows multiple devices 120-122 to be connected to the host. For example, devices 120-122 may correspond to storage devices such as hard disk drives (HDDs), solid-state drives (SSDs), and/or hybrid hard drives (HHDs) that are connected to a processor and/or memory in the computer system through a Serial Advanced Technology Attachment (SATA) host bus adapter 114 and/or port multiplier 118. Alternatively, devices 120-122 may be peripheral devices that are connected to the processor through a Universal Serial Bus (USB) interface, FireWire interface, and/or Thunderbolt (Thunderbolt™ is a registered trademark of Apple Inc.) interface.

To communicate with devices 120-122, an application 102 on the computer system may issue input/output (I/O) requests to the computer system's filesystem 104. The filesystem 104 may relay the requests to one or more device drivers 106-108 for devices 120-122, and device drivers 106-108 may generate commands for the devices based on the requests. The commands may then be sent to host bus adapter 114 and routed through port multiplier 118 to the corresponding devices 120-122 for execution.

Queuing of issued commands may also be supported by device drivers 106-108, host bus adapter 114, and/or devices 120-122. For example, Native Command Queuing (NCQ) may be supported in a SATA interface to reduce latency associated with processing read and write commands on SATA devices. To generate a queued command, a queue-management apparatus 110-112 in a device driver (e.g., device drivers 106-108) may write an operation code (opcode) for the queued command to a command register for the corresponding device. The queue-management apparatus may also write a number of inputs (e.g., logical block addresses, etc.) for the queued command to a task file for the device.

The queued command may then be reordered in a queue with a number of other queued commands to optimize the performance of the device. For example, queued commands in an HDD may be reordered to reduce the seek and/or rotational latencies of the HDD during processing of the commands, while queued commands in an SDD may be reordered to enable concurrent completion of the queued commands (e.g., on multiple flash chips). After the queued commands are placed into the queue, the device may execute the queued commands in the order maintained by the queue.

In addition, the queue-management apparatus may track outstanding queued commands by assigning a tag to each issued queued command. For example, a SATA device driver may issue a queued command to a SATA device with a unique numeric tag (e.g., from 0 to 31) for the queued command. The SATA device driver may also set a bit corresponding to the numeric tag in a 32-bit status register to indicate that the queued command is outstanding. After the queued command is completed by the device, the device may signal the completion of the queued command by clearing the bit in the status register. Conversely, if the queued command generates an error during processing, the device may provide the tag value of the queued command's tag to the device driver to enable error recovery by the device driver.

Those skilled in the art will appreciate that conflicting tags may be used to track queued commands in the computer system if multiple devices 120-122 are connected to host bus adapter 114 via port multiplier 118. For example, device drivers 106-108 (e.g., SATA device drivers) may individually support 32 tags for queued commands in devices 120-122, while host bus adapter 114 may support 32 tags for all queued commands across devices 120-122. Because tag values used by queue-management apparatuses 110-112 to identify queued commands may overlap, device drivers 106-108 and/or host bus adapter 114 may have difficulty tracking the queued commands on devices 120-122.

In one or more embodiments, a tag-allocation apparatus 116 in host bus adapter 114 facilitates the processing of queued commands in multiple devices 120-122 by managing the allocation of tags for queued commands to the devices. For example, tag-allocation apparatus 116 may allocate a set of 32 tags supported by a SATA host bus adapter to a set of SATA devices connected to the SATA host bus adapter using a SATA port multiplier.

More specifically, tag-allocation apparatus 116 may receive a tag request for a device (e.g., devices 120-122) from the queue-management apparatus (e.g., queue-management apparatuses 110-112) for the device. Next, tag-allocation apparatus 116 may allocate a subset of the tags to the device based on an activity level of the device. For example, tag-allocation apparatus 116 may reserve a minimum of two tags for each device connected to host bus adapter 114 through port multiplier 118. After a tag request for the device is received, tag-allocation apparatus 116 may allocate the two reserved tags to the device, as well as additional tags if the device is actively processing commands from application 102 and/or filesystem 104.

Tag-allocation apparatus 116 may then respond to the tag request with the subset of the tags. For example, tag-allocation apparatus 116 may respond to the tag request by sending a bitmap to the queue-management apparatus. Tags allocated to the device may be represented by bits set at the positions of the tags' values within the bitmap, while tags not allocated to the device may be represented by cleared bits in the bitmap.

After receiving the allocated tags, the queue-management apparatus may use the tags to queue commands from the host (e.g., application 102, filesystem 104, etc.) to the device and track the status of the queued commands. As described above, the queue-management apparatus may specify an allocated tag for each queued command issued to the device and set a bit representing the tag in a status register to indicate that the queued command is outstanding. The device may subsequently indicate the completion of the queued command to the queue-management apparatus and/or device driver by clearing the bit in the status register.

Tag-allocation apparatus 116 may also reallocate the tags based on the activity levels of devices 120-122. For example, tag-allocation apparatus 116 may initially allocate four tags to each of two HDDs. Tag-allocation apparatus 116 may then detect a fall in the activity level of the first HDD and a rise in the activity level of the second HDD. In response to the change in activity levels of the HDDs, tag-allocation apparatus 116 may reduce the allocation of tags to the first HDD to two tags and increase the allocation of tags to the second HDD to six tags to facilitate the processing of queued commands in the second, more active HDD. Allocation and reallocation of tags to devices based on activity levels is discussed in further detail below with respect to FIG. 2.

By managing the allocation of tags to multiple devices 120-122 from a centralized tag-allocation apparatus 116, the system of FIG. 1 may ensure the accurate identification and tracking of queued commands across the devices by the host. The system of FIG. 1 may further enable the processing of queued commands on all devices 120-122 by reserving a minimum number of tags for each device. Finally, the system may facilitate the efficient execution of devices 120-122 by allocating and/or reallocating tags to devices 120-122 based on the activity levels of the devices.

Figure 2:
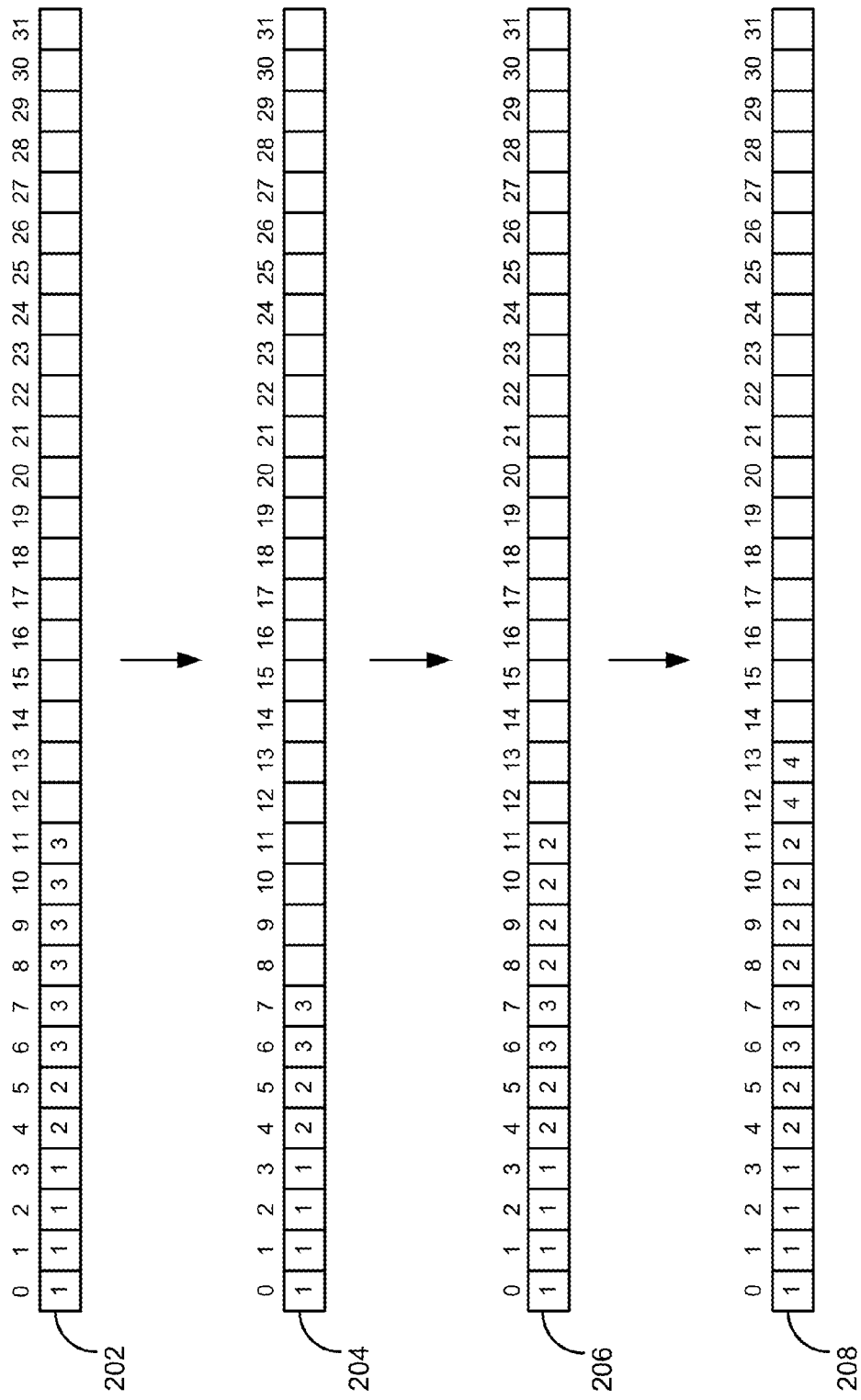
FIG. 2 shows an exemplary allocation of tags for queued commands to a set of devices in accordance with an embodiment.

FIG. 2 shows an exemplary allocation of tags for queued commands to a set of devices in accordance with an embodiment. As shown in FIG. 2, four different allocations 202-208 of a set of 32 tags may be made over time. In each allocation, tag values from 0 to 31 are allocated to a number of devices connected to a host. For example, the tag values may be allocated to a set of HDDs and/or SSDs by a SATA host bus adapter.

Initially, in allocation 202, the first 12 tags (e.g., 0-11) may be allocated to three devices, with the remaining 20 tags unallocated. Furthermore, tags 0-11 may be allocated to the devices after receiving tag requests from the devices. For example, tag requests may be received from device 1, then device 2, and finally device 3. The tag requests may then be processed according to the order of receipt, with tags 0-3 allocated to device 1, tags 4-5 allocated to device 2, and tags 6-11 allocated to device 3.

The tags may also be allocated to the devices based on the activity levels of the devices. For example, the allocated tags may indicate that device 1 has a moderate activity level, device 2 has a low activity level, and device 3 has a high activity level. In addition, tags 12-31 may remain unallocated to enable the processing of subsequent tag requests and/or reallocation of the tags based on changes to the devices' activity levels. For example, two tags from the unallocated tags may be reserved for each device connected to the host that has not yet requested tags. Thus, if tag requests have not yet been received from four devices, eight of the 20 unallocated tags may be reserved for the four devices, and 12 of the 20 unallocated tags may be available for subsequent allocation to all devices connected to the host.

Next, in allocation 204, tags 8-11 may be unallocated from device 3, resulting in eight allocated tags and 24 unallocated tags. The reduction in the number of tags allocated to device 3 may indicate that the activity level of device 3 has dropped. Tags 8-11 may subsequently be reallocated to device 2 in allocation 206, indicating that the activity level of device 2 has increased. Finally, tags 12-13 may be allocated to device 4 in allocation 208 in response to a tag request from device 4, resulting in 14 allocated tags and 18 unallocated tags.

Figure 3:
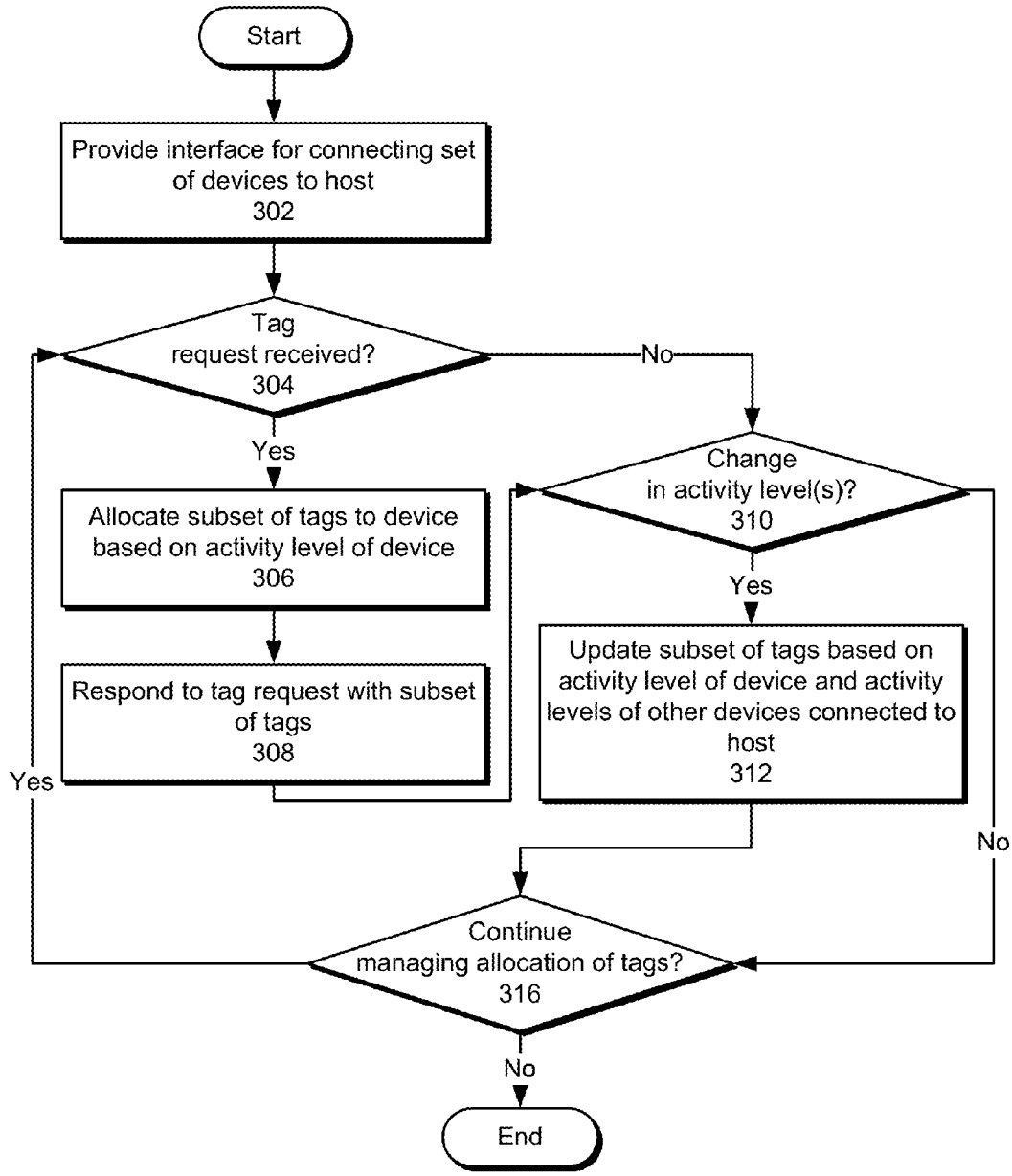
FIG. 3 shows a flowchart illustrating the process of facilitating native command queuing in a set of devices in accordance with an embodiment.

FIG. 3 shows a flowchart illustrating the process of facilitating native command queuing in a set of devices in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

Initially, an interface is provided for connecting a set of devices to a host (operation 302). The interface may correspond to a SATA interface, USB interface, FireWire interface, Thunderbolt interface, and/or another interface with command queuing capabilities. The interface may additionally be used to manage the allocation of a set of tags to one or more of the devices. More specifically, the tags may be allocated based on the receipt of a tag request (operation 304) for a device.

If a tag request is received, a subset of the tags is allocated to the device based on the activity level of the device (operation 306). For example, a minimum of two tags may be reserved for each device connected to the host. Upon receiving a tag request for the device, the reserved tags may be allocated to the device, along with additional tags if the device is experiencing a higher level of activity. After the subset of the tags is allocated, a response to the tag request is made with the subset of the tags (operation 308). The subset of the tags may then be used to queue commands from the host to the device and track the status of the queued commands, as discussed below with respect to FIG. 4. If a tag request for a device is not received, no tags are allocated to the device.

The activity level of the device may also change (operation 310). For example, the activity level of an HDD may fluctuate with the number of read and/or write commands issued to the HDD. If the activity levels have changed, the subset of the tags is updated based on the activity level of the device and/or the activity levels of other devices connected to the host (operation 312). For example, the number of tags allocated to the device may increase if the device's activity level increases and decrease if the device's activity level decreases.

The allocation of tags may continue to be managed (operation 316) while the devices are connected to the host. If the allocation of tags is to be managed, tag requests for devices may be received (operation 304), subsets of the tags may be allocated to the devices based the activity levels of the devices (operation 306), and responses to the tag requests may be made (operation 308). If the activity levels of the devices change (operation 310), the subset(s) of tags may be updated based on the activity levels (operation 312) to ensure the fair allocation of tags to devices connected to the host. The allocation of tags to the devices may thus be managed (operation 316) until the devices are no longer connected to the host and/or processing of queued commands is disabled in the devices.

Figure 4:
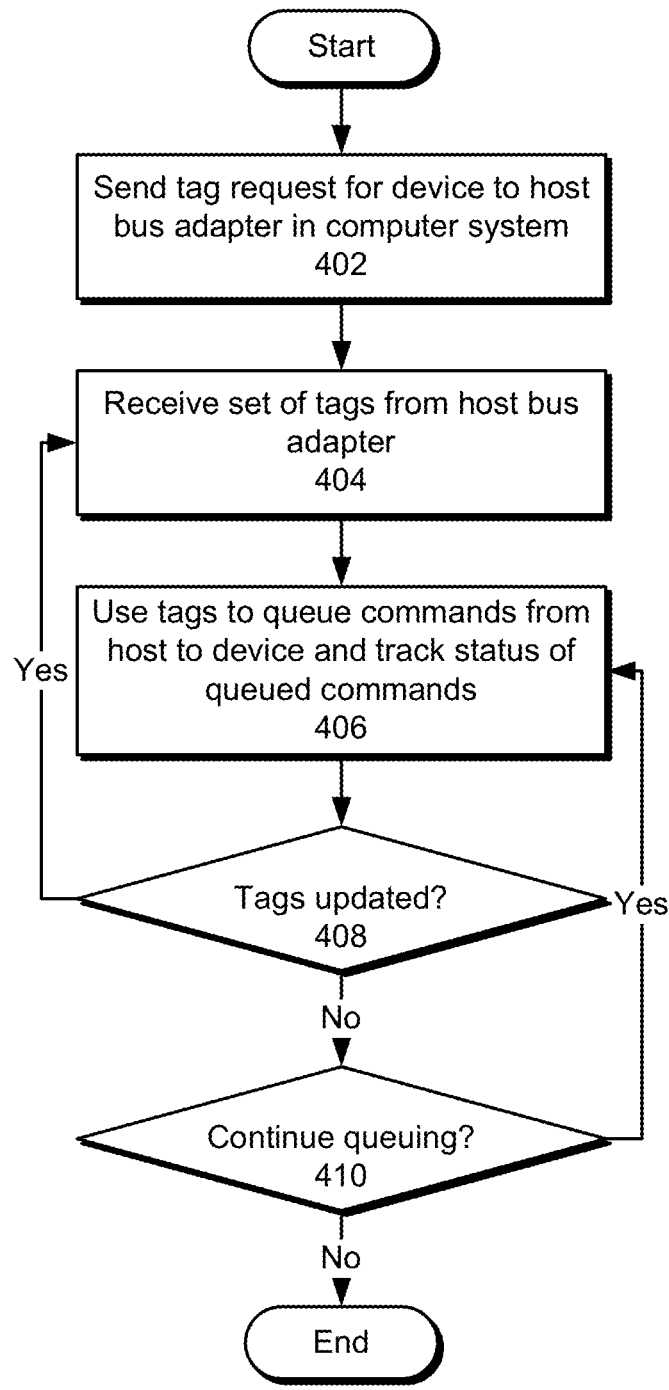
FIG. 4 shows a flowchart illustrating the process of enabling native command queuing for a device in a computer system in accordance with an embodiment.

FIG. 4 shows a flowchart illustrating the process of enabling native command queuing for a device in a computer system in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

First, a tag request for the device is sent to a host bus adapter in the computer system (operation 402). The device may correspond to a storage device, peripheral device, and/or another device connected to an interface by the host bus adapter and/or a port multiplier. Next, a set of tags is received from the host bus adapter (operation 404), and the tags are used to queue commands from a host in the computer system to the device and track the status of the queued commands (operation 406). For example, a queued command may be transmitted to the device with the tag value of one of the tags from the host bus adapter. To track the status of the queued command, the host may set a bit corresponding to the tag value in a status register to indicate that the queued command is outstanding. After the device has completed the queued command, the device may clear the bit in the status register to communicate completion of the queued command to the host.

The tags may also be updated (operation 408). For example, an update to the set of tags may be received based on the activity level of the device and/or the activity levels of other devices connected to the host. If the tags are updated, the updated set of tags is received (operation 404), and the received tags are used to queue commands from the host to the device and track the status of the queued commands (operation 406).

Queuing of commands may continue (operation 410) as long as queued command processing is enabled in the device. If queuing is to continue, the tags are used in the processing of the queued commands (operation 406) and updates to the tags (operation 408) may be received (operation 404) until queued commands are no longer used in the device.

Figure 5:
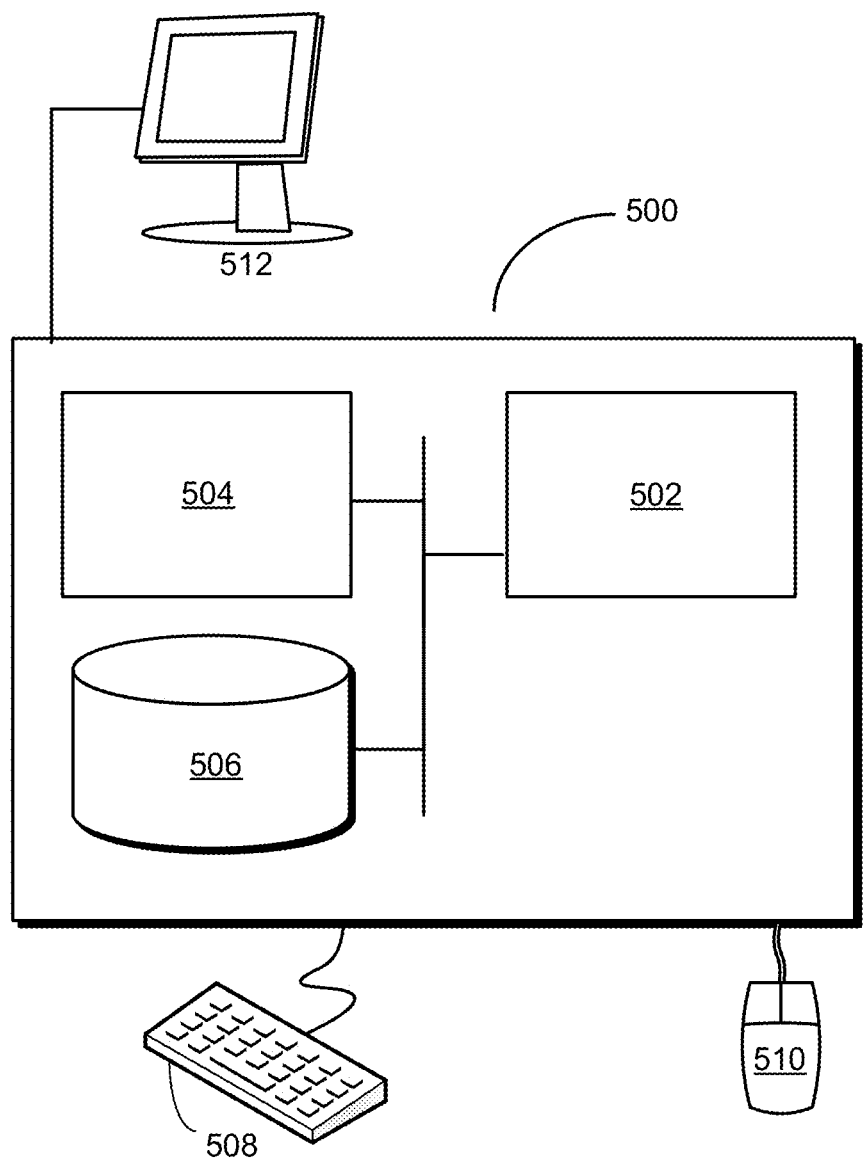
FIG. 5 shows a computer system in accordance with an embodiment.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating the processing of commands in a set of devices. The system may include a host bus adapter that provides an interface for connecting the set of devices to the host and manages the allocation of a set of tags to one or more of the devices. For each device connected to the host, the system may also include a queue-management apparatus that sends a tag request for the device to the host bus adapter. The queue-management apparatus may then receive a subset of the tags for the device from the host bus adapter and use the set of tags to queue commands from the host to the device and track the status of the queued commands.

In addition, one or more components of computer system 500 may be remotely located and connected to the other components over a network. Portions of the present embodiments (e.g., host bus adapter, queue-management apparatus, etc.) may also be located on different nodes of a distributed system that implements the embodiments. For example, the present embodiments may be implemented using a cloud computing system that enables the queuing of commands from a host to a set of remote devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for processing commands associated with a set of devices, comprising:
  providing an interface for connecting the set of devices to a host; and
  managing the allocation of a set of tags to the set of devices, wherein each of the tags is used to queue a command from the host to one of the devices and to track the status of the queued command, and involves:
    receiving a tag request for a particular device in the set of devices;
    allocating a subset of the set of tags to the particular device based on a usage activity level of the particular device, wherein the activity level is based on a number of read/write commands being issued to the particular device; and
    responding to the tag request with the subset of the tags.

2. The method of claim 1, wherein managing the allocation of the set of tags further involves updating the subset of the tags based on activity levels of other devices connected to the host.

3. The method of claim 1, wherein managing the allocation of the set of tags involves reserving two tags for each device in the set of devices.

4. The method of claim 1, wherein the set of devices comprises a storage device.

5. The method of claim 1, wherein the interface is a Serial Advanced Technology Attachment (SATA) interface.

6. A computer-implemented method for processing commands associated with a device in a computer system, comprising:
  sending a tag request for the device to a host bus adapter in the computer system;
  receiving a set of tags from the host bus adapter, wherein the set of tags is allocated by the host bus adapter based on a usage activity level of the device, and the activity level is based on a number of read/write commands being issued to the device; and
  using the set of tags to:
    queue commands from a host in the computer system to the device, and track the status of the queued commands.

7. The computer-implemented method of claim 6, wherein the allocation of the set of tags is further based on activity levels of other devices connected to the host.

8. The computer-implemented method of claim 6, wherein the set of tags comprises two or more tags.

9. The computer-implemented method of claim 6, wherein the device is a storage device.

10. A system for processing commands associated with a set of devices, comprising:
  a host bus adapter, configured to:
    provide an interface for connecting the set of devices to a host, and manage the allocation of a set of tags to one or more of the devices; and
  a queue-management apparatus, configured to:
    send a tag request for a device from the set of devices to the host bus adapter,
    receive a subset of the tags for the device from the host bus adapter, wherein the host bust adapter allocates the subset of tags based on a usage activity level of the device that is based on a number of read/write commands being issued to the device, and use the set of tags to queue commands from the host to the device and to track the status of the queued commands.

11. The system of claim 10, wherein managing the allocation of the set of tags further involves updating the subset of the tags based on activity levels of other devices connected to the host.

12. The system of claim 10, wherein managing the allocation of the set of tags involves reserving two tags for each device in the set of devices.

13. The system of claim 10, wherein the interface is a Serial Advanced Technology Attachment (SATA) interface.

14. A non-transitory computer-readable storage medium storing instructions that when executed by a computer cause the computer to perform a method for facilitating the processing of commands for a device in a computer system, the method comprising:
  sending a tag request for the device to a host bus adapter in the computer system;
  receiving a set of tags from the host bus adapter, wherein the set of tags is based on a first usage activity level of the device, and the usage activity level is based on a number of read/write commands being issued to the device; and
  using the set of tags to:
    queue commands from a host in the computer system to the device, and track the status of the queued commands.

15. The non-transitory computer-readable storage medium of claim 14, the method further comprising receiving an update to the set of tags from the host bus adapter, wherein the update is based on a second activity level of the device.

16. The non-transitory computer-readable storage medium of claim 4, wherein the set of tags comprises two or more tags.

17. The non-transitory computer-readable storage medium of claim 14, wherein the device is a storage device.

18. A computer system, comprising:
  a processor;
  a memory;
  a host bus adapter configured to:
    provide an interface for connecting a set of devices to the host, and manage the allocation of a set of tags to one or more of the devices; and
  a queue-management apparatus configured to:
    send a tag request for a device from the set of devices to the host bus adapter,
    receive a subset of the tags for the device from the host bus adapter, wherein the host bust adapter allocates the subset of tags based on a usage activity level of the device that is based on a number of read/write commands being issued to the device, and
    use the subset of tags to queue commands from the host to the device and to track the status of the queued commands.

19. The computer system of claim 18, further comprising a port multiplier configured to connect the set of devices to the host.

20. The computer system of claim 18, wherein managing the allocation of the set of tags further involves updating the subset of the tags based on usage activity levels of other devices connected to the host.

21. The computer system of claim 18, wherein managing the allocation of the set of tags involves reserving two tags for each device in the set of devices.

22. The computer system of claim 18, wherein the interface is a Serial Advanced Technology Attachment (SATA) interface.

* * * * *

UNITED STATES PATENT AND TRADEMARK OFFICE
CERTIFICATE OF CORRECTION

PATENT NO. : 8,661,163 B2
APPLICATION NO. : 13/215079
DATED : February 25, 2014
INVENTOR(S) : Sarcone et al.

It is certified that error appears in the above-identified patent and that said Letters Patent is hereby corrected as shown below:

In the Claims:

Column 8, claim 1, line 18, currently reads: "device, wherein the activity level is based on a number"
Column 8, claim 1, line 18, should read: "device, wherein the usage activity level is based on a number"

Column 8, claim 2, line 24, currently reads: "tags based on activity levels of other devices connected to the"
Column 8, claim 2, line 24, should read: "tags based on usage activity levels of other devices connected to the"

Column 8, claim 6, line 40, currently reads: "on a usage activity level of the device, and the activity"
Column 8, claim 6, line 40, should read: "on a usage activity level of the device, and the usage activity"

Column 8, claim 7, line 48, currently reads: "the allocation of the set of tags is further based on activity"
Column 8, claim 7, line 48, should read: "the allocation of the set of tags is further based on usage activity"

Column 9, claim 11, line 6, currently reads: "the tags based on activity levels of other devices connected to"
Column 9, claim 11, line 6, should read: "the tags based on usage activity levels of other devices connected to"

Column 9, claim 14, line 22, currently reads: "device, and the usage activity level is based on a number"
Column 9, claim 14, line 22, should read: "device, and the first usage activity level is based on a number"

Signed and Sealed this
Third Day of June, 2014

Michelle K. Lee
*Deputy Director of the United States Patent and Trademark Office*

CERTIFICATE OF CORRECTION (continued)
U.S. Pat. No. 8,661,163 B2

Column 9, claim 15, line 31, currently reads: "update is based on a second activity level of the device."
Column 9, claim 15, line 31, should read: "update is based on a second usage activity level of the device."

Column 9, claim 16, line 33, currently reads: "of claim 4, wherein the set of tags comprises two or more tags."
Column 9, claim 16, line 33, should read: "of claim 14, wherein the set of tags comprises two or more tags."